United States Patent
Pham

(10) Patent No.: US 10,395,139 B2
(45) Date of Patent: Aug. 27, 2019

(54) INFORMATION PROCESSING APPARATUS, METHOD AND COMPUTER PROGRAM PRODUCT

(71) Applicant: KABUSHIKI KAISHA TOSHIBA, Tokyo (JP)

(72) Inventor: Quoc Viet Pham, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 15/439,283

(22) Filed: Feb. 22, 2017

(65) Prior Publication Data

US 2018/0005089 A1 Jan. 4, 2018

(30) Foreign Application Priority Data

Jun. 29, 2016 (JP) ................................. 2016-129001

(51) Int. Cl.
*G06K 9/62* (2006.01)
*G06T 7/73* (2017.01)
*G06T 7/77* (2017.01)

(52) U.S. Cl.
CPC .............. *G06K 9/6254* (2013.01); *G06T 7/75* (2017.01); *G06T 7/77* (2017.01);
(Continued)

(58) Field of Classification Search
None
See application file for complete search history.

(56) References Cited

U.S. PATENT DOCUMENTS 8,106,968 B1 * 1/2012 Rudin .................... G06T 5/006
348/241
8,774,532 B2 * 7/2014 Brown ............... G06K 9/00369
382/224

(Continued)

FOREIGN PATENT DOCUMENTS

JP 2003-30173 1/2003
JP 2014-6655 1/2014

(Continued)

OTHER PUBLICATIONS

Ren, S., et al., "Global Refinement of Random Forest", IEEE Conference on Computer Vision and Pattern Recognition, CVPR, pp. 723-730 (2015).

*Primary Examiner* — Fayyaz Alam
(74) *Attorney, Agent, or Firm* — Finnegan, Henderson, Farabow, Garrett & Dunner, L.L.P.

(57) ABSTRACT

According to an embodiment, an information processing apparatus includes a memory and processing circuitry. The processing circuitry configured to acquire an input image captured by an image-capturing device installed in a specific location. The processing circuitry configured to perform adaptation processing of adapting an estimation model, which is used for detecting positions or the number of objects contained in an image, to the specific location by sequentially selecting a parameter of the estimation model from a lower level toward a higher level, and by modifying the selected parameter in such a manner to reduce an estimation error in the positions or the number of the objects contained in the input image. The processing circuitry configured to acquire a termination condition for the adaptation processing. The processing circuitry configured to terminate the adaptation processing when the termination condition is satisfied.

20 Claims, 12 Drawing Sheets

(52) U.S. Cl.
CPC ............... *G06T 2207/10016* (2013.01); *G06T 2207/20021* (2013.01); *G06T 2207/20072* (2013.01); *G06T 2207/20081* (2013.01); *G06T 2207/30196* (2013.01); *G06T 2207/30232* (2013.01); *G06T 2207/30242* (2013.01)

(56) References Cited

U.S. PATENT DOCUMENTS

| | | |
|---|---|---|
| 2003/0028275 A1 | 2/2003 | Fromherz et al. |
| 2009/0028403 A1* | 1/2009 | Bar-Aviv ............... G06F 19/321 |
| | | 382/128 |
| 2012/0207359 A1* | 8/2012 | Konukoglu ............... G06T 7/35 |
| | | 382/128 |
| 2015/0242709 A1 | 8/2015 | Pham |
| 2018/0101732 A1* | 4/2018 | Uchiyama .......... G06K 9/00771 |

FOREIGN PATENT DOCUMENTS

| | | |
|---|---|---|
| JP | 2014-164525 | 9/2014 |
| JP | 2015-87973 | 5/2015 |
| JP | 2015-158712 | 9/2015 |

\* cited by examiner

INPUT TERMINATION CONDITION

⦿ ESTIMATION ERROR [    ] %

◯ ELAPSED TIME [    ] SECONDS

INFORMATION PROCESSING APPARATUS, METHOD AND COMPUTER PROGRAM PRODUCT

CROSS-REFERENCE TO RELATED APPLICATIONS

This application is based upon and claims the benefit of priority from Japanese Patent Application No. 2016-129001, filed on Jun. 29, 2016; the entire contents of which are incorporated herein by reference.

FIELD

An embodiment described herein relates generally to an information processing apparatus, an information processing method and a computer program product.

BACKGROUND

There are known adaptation devices that adapt an estimation model, which is a regression model created through machine learning using learning data for a general environment, to a specific environment. For example, when a general estimation model for estimating the number of persons contained in an image is adapted to an estimation system that estimates the number of pedestrians on the basis of a captured image of a passage of a station or other locations, such an adaptation device uses images captured by an image-capturing device installed in the passage of the station or other locations to modify the general estimation model. An adaptation technique of this type is called domain adaptation, transfer learning, or knowledge transfer, for example.

When adapting a general estimation model to a specific environment, the adaptation device modifies parameters included in the estimation model. However, the estimation model includes many parameters. Thus, the adaptation device needs to adjust these parameters appropriately at great expense of time and computation cost.

DETAILED DESCRIPTION

Figure 1:
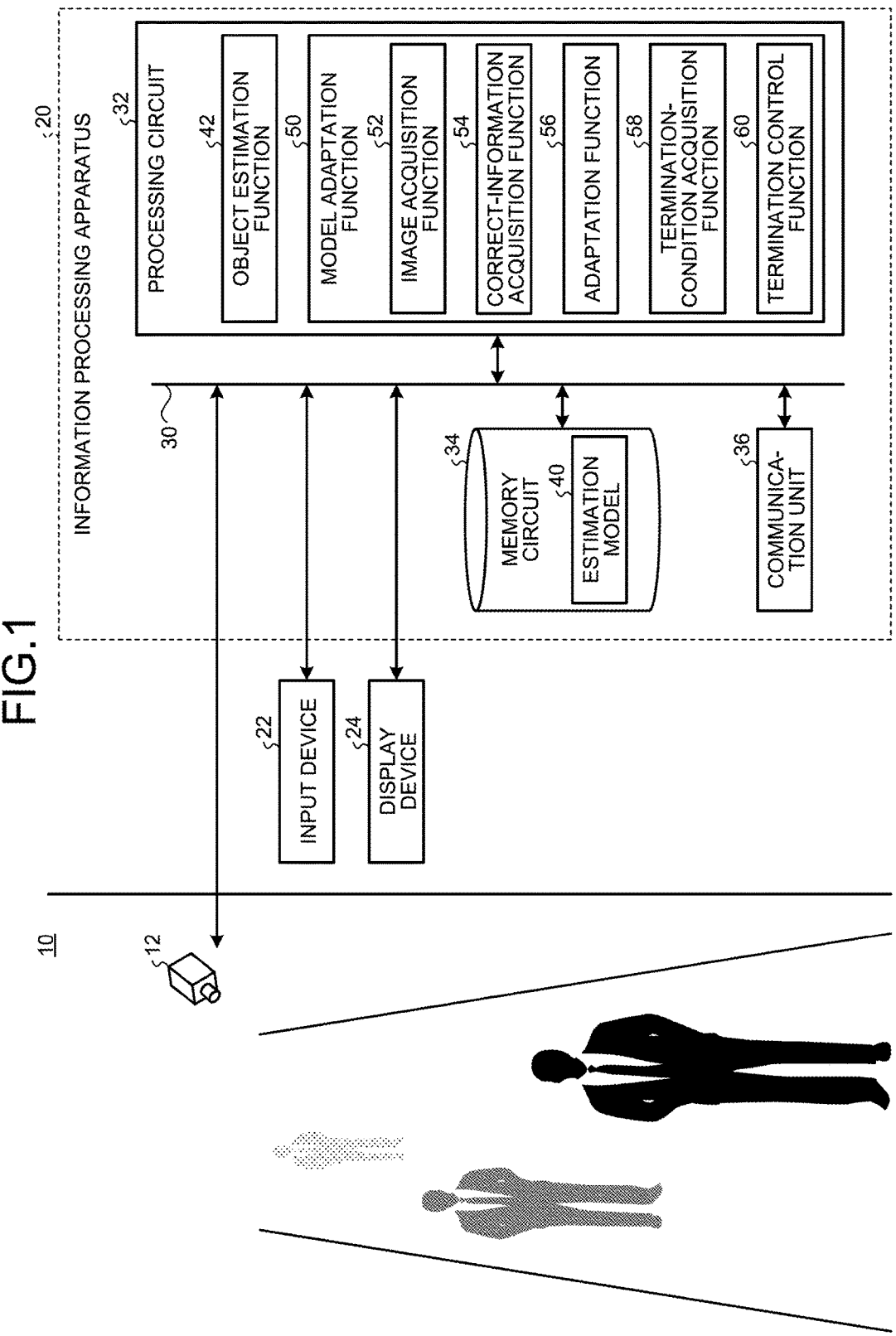
FIG. 1 is a diagram illustrating an estimation system according to an embodiment.

According to an embodiment, an information processing apparatus includes a memory and processing circuitry. The processing circuitry configured to acquire an input image captured by an image-capturing device installed in a specific location. The processing circuitry configured to perform adaptation processing of adapting an estimation model, which is used for detecting positions or the number of objects contained in an image, to the specific location by sequentially selecting a parameter of the estimation model from a lower level toward a higher level, and by modifying the selected parameter in such a manner to reduce an estimation error in the positions or the number of the objects contained in the input image. The processing circuitry configured to acquire a termination condition for the adaptation processing. The processing circuitry configured to terminate the adaptation processing when the termination condition is satisfied.

An embodiment will be described below with reference to the accompanying drawings. In the embodiment, elements denoted by the same reference numerals are substantially the same in configuration and operation, and thus duplicate description is omitted, except for different points.

FIG. 1 is a diagram illustrating the estimation system 10 according to the embodiment. The estimation system 10 estimates the positions or the number of objects on the basis of a captured image of the objects. In the present embodiment, the objects are persons. In the present embodiment, the estimation system 10 estimates the positions or the number of persons contained in an image that is captured from a specific position in a station or other locations. Herein, the objects are not limited to persons, and may be vehicles or microorganisms, for example.

The estimation system 10 includes an image-capturing device 12, an information processing apparatus 20, an input device 22, and a display device 24.

The image-capturing device 12 is installed in a specific location where images of a predetermined space through or in which objects pass or stay can be captured. The image-capturing device 12 captures images of the predetermined space from the specific location. For example, when the objects are persons, the image-capturing device 12 captures images of a surface on which persons in a station or other locations move, from above at a predetermined angle. The image-capturing device 12 captures images at a predetermined frame rate, and transmits the respective obtained images thus captured to the information processing apparatus 20. The images captured by the image-capturing device 12 may be various images such as visible-light images, infrared-light images, or depth images.

The information processing apparatus 20 performs various image processing operations using the images captured by the image-capturing device 12. For each of input images into which each image captured by the image-capturing device 12 is divided, the information processing apparatus estimates the positions or the number of objects contained in the input image. When the objects are persons, the information processing apparatus 20 estimates the positions or the number of persons contained in the input image. The information processing apparatus 20 is a dedicated or general computer, for example. The information processing apparatus 20 may be a personal computer, or may be a computer included in a server configured to store and manage images.

The information processing apparatus 20 includes a processing circuit 32, a memory circuit 34, a communication unit 36, and a bus 30 connecting the respective components. The information processing apparatus 20 is connected to the image-capturing device 12 via the bus 30, for example.

The processing circuit 32 has an object estimation function 42 and a model adaptation function 50. The model adaptation function 50 includes an image acquisition function 52, a correct-information acquisition function 54, an adaptation function 56, a termination-condition acquisition function 58, and a termination control function 60. Each of these processing functions will be described later.

Each processing function performed in the information processing apparatus 20 is stored in the memory circuit 34 in a form of a program executable by a computer. The processing circuit 32 is a processor that reads programs from the memory circuit 34 and executes the programs to implement functions corresponding to the respective programs. The processing circuit 32 after reading the respective programs has the corresponding functions depicted in the processing circuit 32 in FIG. 1. In FIG. 1, description has been made on the assumption that a single processing circuit 32 implements processing functions to be performed by the object estimation function 42 and the model adaptation function 50. However, a plurality of independent processors may be combined to constitute the processing circuit 32, and the respective processors may execute the programs to implement the functions. The respective processing functions may be configured as programs, and the respective programs may be executed by one circuit, or a certain function may be implemented in a dedicated independent program-executing circuit.

Herein, the object estimation function 42 of the processing circuit 32 is one example of an estimation device. The model adaptation function 50 of the processing circuit 32 is one example of an adaptation device. The image acquisition function 52, the correct-information acquisition function 54, the adaptation function 56, the termination-condition acquisition function 58, and the termination control function 60 are examples of an image acquisition unit, a correct-information acquisition unit, an adaptation unit, a termination-condition acquisition unit, and a termination controller, respectively.

The term "processor" used in the above description means, for example, a central processing unit (CPU), a graphical processing unit (GPU), an application specific integrated circuit (ASIC), or a circuit of a programmable logic device (e.g., a simple programmable logic device (SPLD), a complex programmable logic device (CPLD), or a field programmable gate array (FPGA)). The processor reads and executes programs stored in the memory circuit 34 to implement the corresponding functions. Instead of storing the programs in the memory circuit 34, the programs may be directly embedded in a circuit of the processor. In this case, the processor reads and executes the programs embedded in the circuit to implement the functions.

The memory circuit 34 stores therein data, for example, that accompanies the respective processing functions performed by the processing circuit 32 if needed. The memory circuit 34 stores therein programs executed by the processing circuit 32.

The memory circuit 34 according to the present embodiment stores therein an estimation model 40 that is a regression model used for estimating the positions or the number of objects. Furthermore, the memory circuit 34 according to the present embodiment stores therein images captured by the image-capturing device 12. The memory circuit 34 according to the present embodiment stores therein various set values and user interface images, for example, used for estimation and adaptation processing performed on the estimation model 40. The memory circuit 34 according to the present embodiment stores therein various pieces of data generated in processes of the estimation and the adaptation processing performed on the estimation model 40. The memory circuit 34 according to the present embodiment may store therein correct information indicating the positions or the number of objects (e.g., persons) contained in each input image.

For example, the memory circuit 34 is a random access memory (RAM), a semiconductor memory element such as a flash memory, a hard disk, or an optical disk. Processing operations performed by the memory circuit 34 may be performed by a storage device outside the information processing apparatus 20 instead. The memory circuit 34 may be a storage medium that stores or temporarily stores therein programs conveyed and downloaded via a local area network (LAN) or the Internet, for example. The number of storage media is not limited to one, and the case that the above-described processing operations in the embodiment are performed by a plurality of media is also included in the storage medium according to the embodiment, and thus the medium may be configured in either manner.

The communication unit 36 is an interface through which information is input from and output to an external device connected in a wired or wireless manner. The communication unit 36 may be connected to a network to communicate.

The input device 22 receives various instructions and information input from an operator. The input device 22 is a pointing device such as a mouse or a trackball or an input device such as a keyboard. The input device 22 according to the present embodiment may acquire correct information on the positions or the number of persons contained in each input image on the basis of operation of a user.

The display device 24 displays various pieces of information such as image data. The display device 24 is a display device such as a liquid crystal display. The display device 24 according to the present embodiment may prompt the user to input correct information on the positions or the number of objects contained in the input image.

The input device 22 and the display device 24 of the present embodiment are connected to the information processing apparatus 20 in a wired or wireless manner. The input device 22 and the display device 24 may be connected to the information processing apparatus 20 via a network.

Figure 2:
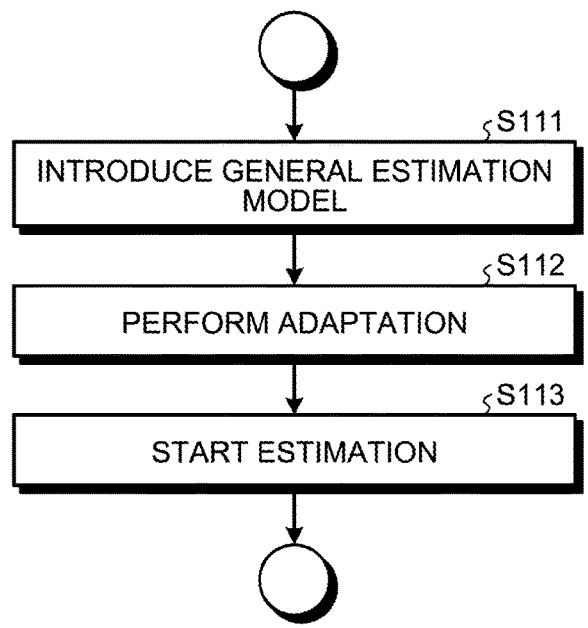
FIG. 2 is a flowchart illustrating a processing procedure in the estimation system.

FIG. 2 is a flowchart illustrating a processing procedure in the estimation system 10 according to the embodiment.

To begin with, at step S111, the information processing apparatus 20 introduces a general estimation model 40. Specifically, the information processing apparatus 20 acquires the general estimation model 40 via a network or media, for example, and causes the memory circuit 34 to store therein this estimation model so that the estimation model can be referred to by the processing circuit 32.

The general estimation model 40 is configured with knowledge data obtained through machine learning using learning samples (images and correct information) captured under general environments. In other words, the general estimation model 40 is configured with knowledge data obtained through machine learning based on a large number of samples (images and correct information) that cover a plurality of conditions.

Subsequently, at step S112, the information processing apparatus 20 adapts the general estimation model 40 thus introduced to a specific location. For example, the information processing apparatus 20 causes the model adaptation function 50 included in the processing circuit 32 to start operating in response to an adaptation-start instruction issued by the user. Based on images captured by the image-capturing device 12 installed in a specific location, the model adaptation function 50 modifies the estimation model 40 so that estimation model 40 can be adapted to the specific location. In other words, the information processing apparatus 20 adjusts the estimation model 40 for the specific location. Consequently, the information processing apparatus 20 can reduce estimation errors when the estimation model 40 estimates the positions or the number of objects on the basis of the images captured by the image-capturing device 12 installed in the specific location.

When adaptation of the estimation model 40 has succeeded, at step S113, estimation using the adapted estimation model 40 is started. For example, in response to the estimation-start instruction issued by the user, the information processing apparatus 20 causes the object estimation function 42 included in the processing circuit 32 to start operating. The object estimation function 42 uses the adapted estimation model 40 to estimate the positions or the number of objects on the basis of the images captured by the image-capturing device 12.

In the present embodiment, the object estimation function 42 uses a group analysis technique as described in JP-A 2015-158712 (KOKAI), for example, to estimate the positions or the number of objects contained in each image. The estimation in the object estimation function 42 will be described later with reference to FIG. 10 and subsequent drawings.

Figure 3:
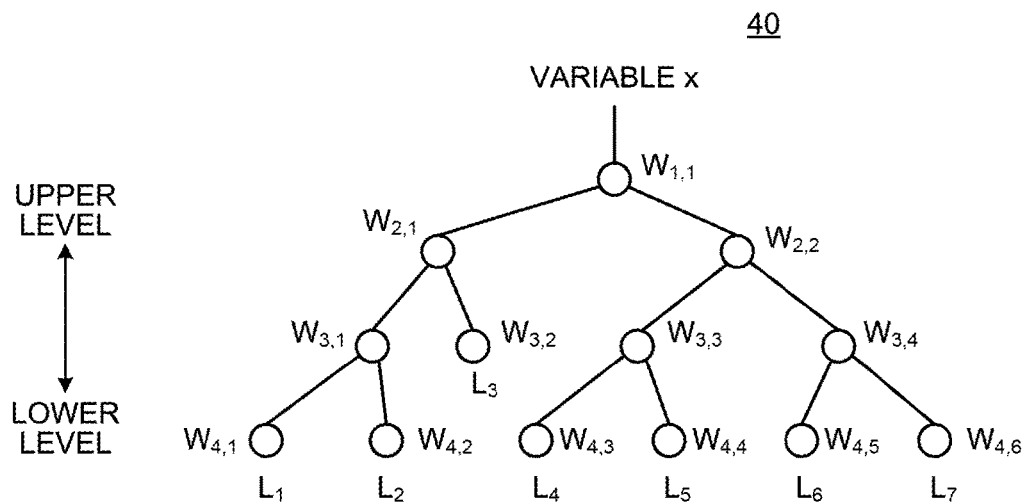
FIG. 3 is a diagram illustrating one example of an estimation model.

FIG. 3 is a diagram illustrating one example of the estimation model 40. The estimation model 40 is a regression model for obtaining a response to a given variable. In the present embodiment, the estimation model 40 is a hierarchical regression model for detecting the positions or the number of objects contained in each image.

For example, the estimation model 40 is a random forest. The random forest has a plurality of nodes. The nodes are connected by links in a tree structure. To each of the nodes, a parameter is allocated. The parameter is information for classifying a given variable. To each terminal node, a label is allocated. The label is output as a response when a variable is given.

In FIG. 3, $W_{a,b}$ represents a parameter. The letter "a" represents a level of a node to which that parameter is allocated. The letter "a" is a natural number, which indicates a higher level when the value thereof is smaller. The letter "b" is a natural number, which indicates an index for identifying a node in the same level. In FIG. 3, $L_c$ represents a label. The letter "c" is a natural number, which indicates an index for identifying a terminal node.

For example, when a variable x is given, the estimation model 40 outputs a response y of some kind. Specifically, when a variable x is given, the estimation model 40 follows the nodes from the top node toward lower levels. In this case, the estimation model 40 classifies, at each node, the variable x by the condition indicated in the allocated parameter $W_{a,b}$ to select a node in the next level. For example, in the example in FIG. 3, at the top node, the estimation model 40 classifies the variable x by the parameter $W_{1,1}$ and, based on the classification result, selects either one node out of two nodes in the second level. After reaching a terminal node, the estimation model 40 outputs the label $L_c$ allocated to the terminal node as a response y to the variable x.

In the estimation model 40 having such a hierarchical structure, parameters allocated to nodes in higher levels exert greater influence on the response y than parameters allocated to nodes in lower levels do. For example, in the example in FIG. 3, the parameter $W_{2,1}$ is allocated to a node in a higher level than the parameter $W_{3,1}$ is. The parameter $W_{3,1}$ exerts influence when the label $L_1$ and the label $L_2$ are output. The parameter $W_{2,1}$ exerts influence when the label $L_1$, the label $L_2$, and the label $L_3$ are output. Thus, the parameter $W_{2,1}$ exerts greater influence on the response than the parameter $W_{3,1}$ does.

In the present embodiment, to the estimation model 40, a plurality of types of feature amounts representing local images each having a predetermined shape and a predetermined size are given as variables x. Based on the types of feature amounts representing local images, to each node of the estimation model 40, a parameter for classifying the local images is allocated. For example, the parameter is a threshold for classifying any one of the feature amounts.

To each terminal node, a label L is allocated. The label L identifies vector information representing the position of an object contained in a local image. The estimation model 40 thus configured receives a plurality of feature amounts representing local images as variables x, and outputs pieces of vector information representing the positions of objects in the local images as responses y. The object estimation function 42 uses this estimation model 40 to estimate, based on an image captured by the image-capturing device 12, the positions or the number of objects contained in the image.

In the present embodiment, the estimation model 40 is a random forest. However, the estimation model 40 may be any type of hierarchical model.

Figure 4:
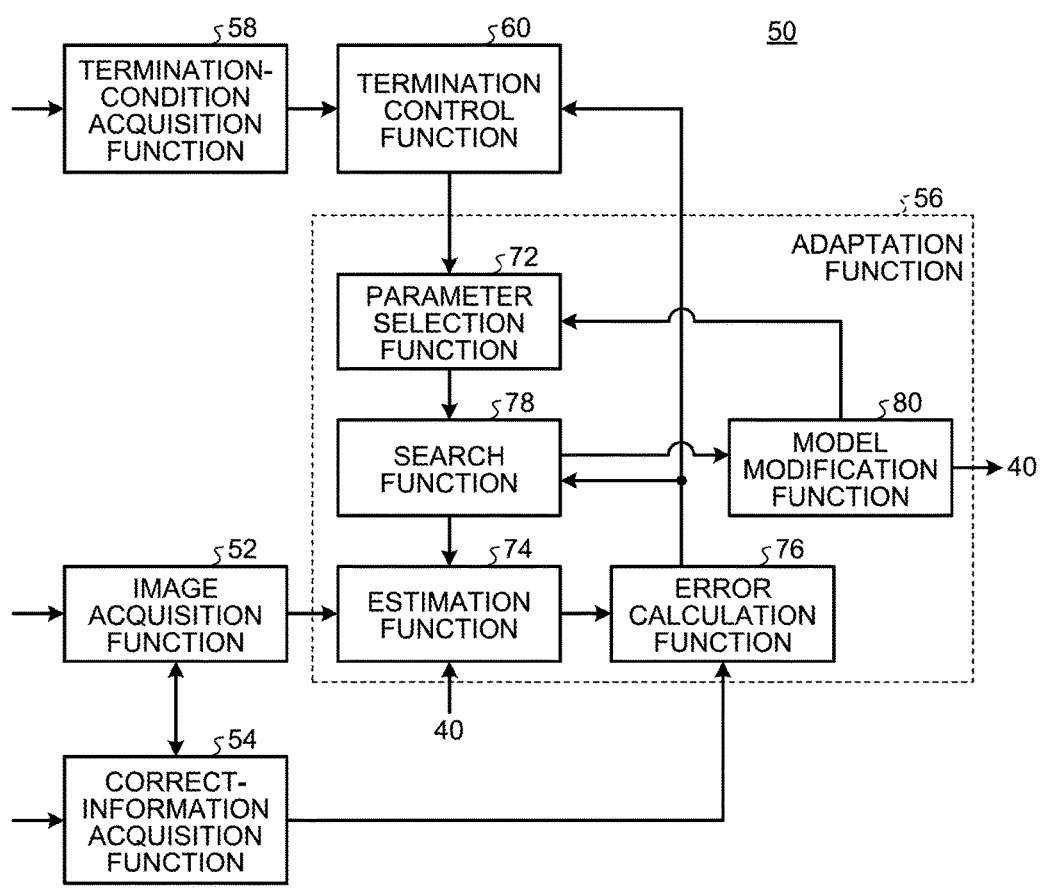
FIG. 4 is a diagram illustrating one example of a configuration of a model adaptation function.

FIG. 4 is a diagram illustrating one example of a configuration of the model adaptation function 50. The model adaptation function 50 includes the image acquisition function 52, the correct-information acquisition function 54, the adaptation function 56, the termination-condition acquisition function 58, and the termination control function 60.

The image acquisition function 52 acquires a captured image that is captured by the image-capturing device 12 installed in a specific location. The image acquisition function 52 acquires a plurality of captured images, for example. The image acquisition function 52 may acquire a plurality of captured images stored in advance in the memory circuit 34, or may acquire a plurality of captured images from the image-capturing device 12 during image-capturing processing. The image acquisition function 52 divides each captured image thus acquired into a plurality of input images each having a predetermined size and shape.

The correct-information acquisition function 54 acquires, on each of the input images acquired by the image acquisition function 52, correct information indicating the positions or the number of objects contained. The correct-information acquisition function 54 may acquire the correct information from the memory circuit 34. The correct-information acquisition function 54 may also acquire correct information input by the user via the input device 22 and the display device 24. Thus, the correct-information acquisition function 54 can acquire accurate correct information. The correct-information acquisition function 54 may also acquire correct information detected by person-detection processing (e.g., face-detection processing) that is different from the estimation using the estimation model 40. Thus, the correct-information acquisition function 54 can acquire correct information without receiving input from the user.

Based on the input images acquired by the image acquisition function 52, the adaptation function 56 performs adaptation processing of adapting the estimation model 40 stored in the memory circuit 34 to the specific location. In other words, based on the input images, the information processing apparatus 20 adjusts the estimation model 40 for the specific location. Consequently, the information processing apparatus 20 can reduce estimation errors when the estimation model 40 estimates the positions or the number of objects on the basis of the images captured by the image-capturing device 12 installed in the specific location.

More specifically, the adaptation function 56 sequentially selects parameters of the estimation model 40 from the lower level toward the higher level one by one. The adaptation function 56 then performs adaptation processing by modifying the selected parameters in such a manner to reduce estimation errors in the positions or the number of objects contained in an input image. For example, when a plurality of input images are acquired, the adaptation function 56 modifies the selected parameters in such a manner to reduce estimation errors in the positions or the number of objects contained in each of the input images.

The termination-condition acquisition function 58 acquires a termination condition for the adaptation processing performed by the adaptation function 56. The termination-condition acquisition function 58 may acquire a termination condition that is stored in advance from the memory circuit 34. The termination-condition acquisition function 58 also acquires a termination condition that is input by the user via the input device 22 and the display device 24. Consequently, the termination-condition acquisition function 58 can acquire a termination condition desired by the user.

For example, the termination condition may be a value of an estimation error. Alternatively, for example, the termination condition may be an elapsed time from the start of the adaptation processing. The termination condition may be both of the value of an estimation error and the elapsed time from the start of the adaptation processing.

If the termination condition is satisfied, the termination control function 60 terminates the adaptation processing performed by the adaptation function 56. More specifically, if the termination condition is satisfied in a period when the adaptation function 56 is modifying parameters while sequentially selecting the parameters from the lower level toward the higher level, the termination control function 60 terminates selection and modification of the parameters.

For example, in the case that the termination condition is a value of an estimation error, the termination control function 60 terminates the adaptation processing in response when the estimation error has decreased to the acquired value or below. For example, in the case that the termination condition is an elapsed time from the start of the adaptation processing, the termination control function 60 terminates the adaptation processing in response to the time having elapsed more than the acquired elapsed time from the start of the adaptation processing. For example, in the case that the termination condition is both of the value of an estimation error and the elapsed time, the termination control function 60 terminates the adaptation processing in response to the estimation error having decreased to the acquired value or below, or in response to the time having elapsed more than the elapsed time from the start of the adaptation processing.

The adaptation function 56 includes a parameter selection function 72, an estimation function 74, an error calculation function 76, a search function 78, and a model modification function 80. The parameter selection function 72, the estimation function 74, the error calculation function 76, the search function 78, and the model modification function 80 are examples of a parameter selection unit, an estimation unit, an error calculation unit, a search unit, and a model modification unit, respectively.

The parameter selection function 72 sequentially selects parameters of the estimation model 40 from the lower level toward the higher level one by one. For example, when a plurality of parameters exist in the same level, the parameter selection function 72 may randomly select one parameter from the parameters in the same level. In this case, for example, the parameter selection function 72 may select one parameter in a predetermined order of indices from the parameters in the same level.

The estimation function 74 receives the respective input images acquired by the image acquisition function 52. The estimation function 74 uses the estimation model 40 to estimate the positions or the number of objects contained in each input image. The estimation function 74 changes the value of the parameter selected by the parameter selection function 72 in response to an instruction issued by the search function 78. Every time the value of the selected parameter is changed, the estimation function 74 uses the estimation model 40 in which the value of the selected parameter has been changed to estimate the positions or the number of objects contained in each input image. The estimation function 74 then transmits the estimation result on each input image to the error calculation function 76.

The error calculation function 76 receives correct information on the positions or the number of objects contained in each input image from the correct-information acquisition function 54. The error calculation function 76 receives an estimation result of the positions or the number of objects contained in each input image that has been estimated by the estimation function 74. The error calculation function 76 calculates an estimation error on the basis of the estimation result and the correct information for each input image. The error calculation function 76 transmits the estimation error for each input image to the search function 78.

The search function 78 instructs the estimation function 74 to change the value of the parameter selected by the parameter selection function 72. Every time issuing an instruction to change the value of the selected parameter, the search function 78 causes the estimation function 74 to estimate the positions or the number of objects contained in each input image.

In response to an instruction being issued to change the value of the selected parameter, the search function 78 receives the estimation error for each input image from the error calculation function 76. The search function 78 then identifies, for the selected parameter, a value that minimizes the sum of estimation errors of the acquired input images.

For example, the search function 78 instructs the estimation function 74 to change values within a possible range at predetermined intervals for the parameter selected by the parameter selection function 72. In this case, the estimation function 74 changes the value of the selected parameter within the possible range at the predetermined intervals, and outputs the estimation result of the positions or the number of objects contained in each input image. The search function 78 then identifies, out of values within the possible range, for the selected parameter, a value that minimizes the sum of the estimation errors of the acquired input images.

The search function 78 may identify, for the selected parameter, a value by which the sum of estimation errors of the acquired input images is at least reduced to be smaller than the sum thereof before the change.

When the value by which the sum of the estimation errors of the input images is minimized or is at least reduced to be smaller than the sum thereof before the change is identified for the selected parameter, the model modification function 80 modifies the value of the selected parameter in the estimation model 40. After modifying the value of the parameter, the model modification function 80 causes the parameter selection function 72 to select the subsequent parameter.

The parameter selection function 72 receives a termination instruction from the termination control function 60. When having received the termination instruction, the parameter selection function 72 terminates the processing of selecting parameters. When the processing of selecting parameters has been terminated, the adaptation function 56 terminates the processing of modifying parameters of the estimation model 40. In this manner, if the termination condition is satisfied in a period when the adaptation function 56 is modifying parameters while sequentially selecting the parameters from the lower level toward the higher level, the adaptation function can terminate selection and modification of the parameters.

Figure 5:
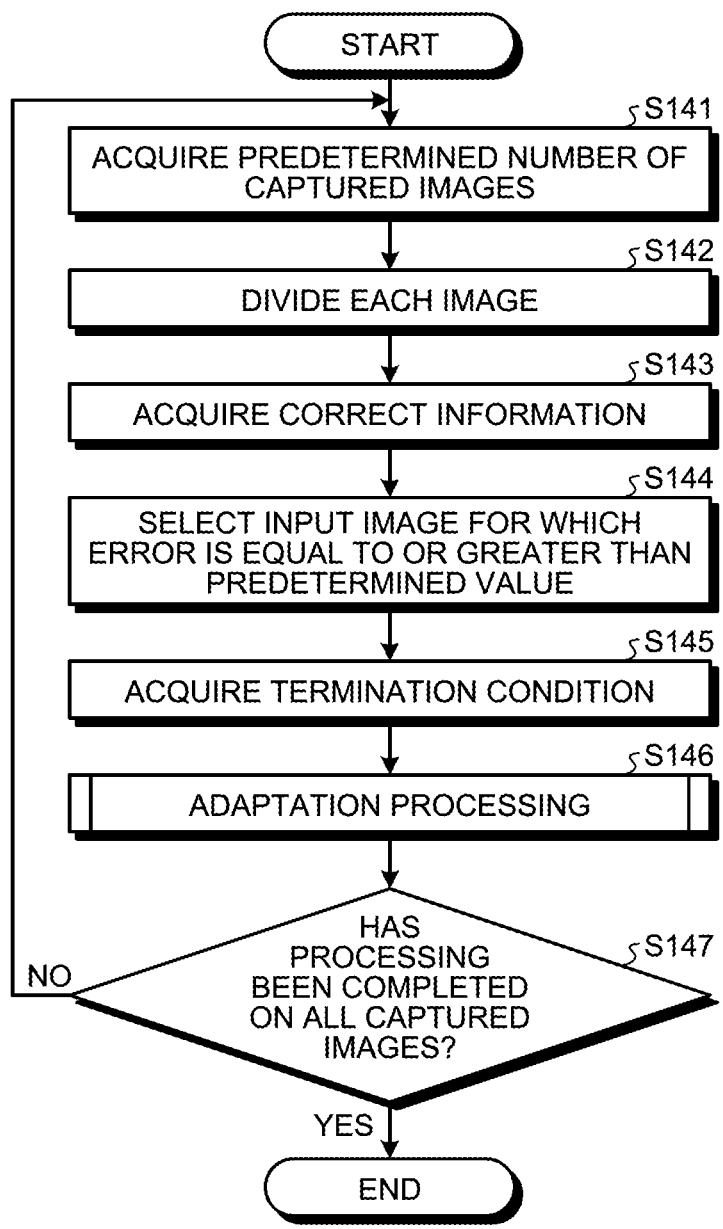
FIG. 5 is a flowchart illustrating a processing procedure of the model adaptation function.

FIG. 5 is a flowchart illustrating a processing procedure of the model adaptation function 50. When adapting the general estimation model 40 to the specific location, the model adaptation function 50 performs the processing depicted in FIG. 5.

Figures 6, 7:
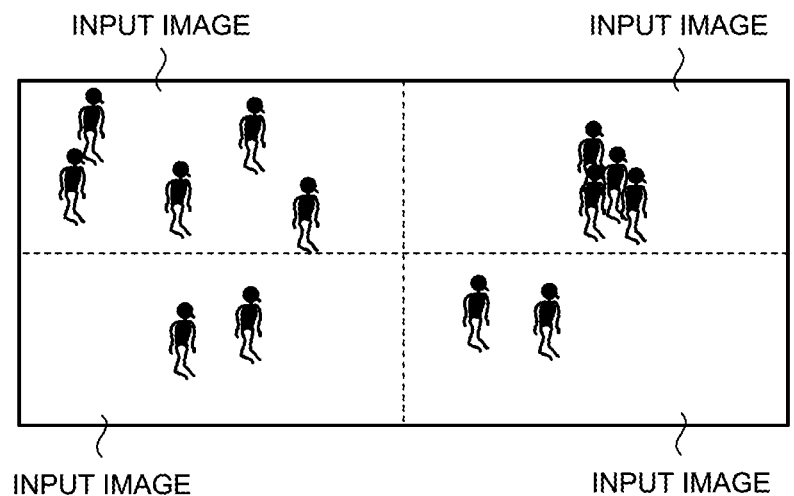
FIG. 6 is a diagram illustrating one example of a plurality of input images generated by dividing a captured image.
FIG. 7 is a diagram illustrating one example of a screen for inputting correct information.

To begin with, at step S141, the image acquisition function 52 acquires a predetermined number of captured images captured by the image-capturing device 12. Subsequently, at step S142, the image acquisition function 52 divides each captured image captured by the image-capturing device 12 into a plurality of input images each having a predetermined size. For example, the image acquisition function 52 quadrisects one captured image into four input images having the same size as depicted in FIG. 6, for example.

Subsequently, at step S143, the correct-information acquisition function 54 acquires correct information on each input image. For example, the correct-information acquisition function 54 displays the input images as depicted in FIG. 7, and prompts the user to input correct information on the positions or the number of objects (e.g., persons) for each input image. The correct-information acquisition function 54 may display a box for each input image, and may use a numerical value input in the box as correct information on the number of objects. The correct-information acquisition function 54 may prompt the user to point each object on the input image, and may use this pointed position as correct information on the position of the object.

Subsequently, at step S144, the image acquisition function 52 selects, out of a plurality of input images, an input image for which the error between the estimation result and the correct information on the positions or the number of objects is equal to or greater than a predetermined value, as an input image used for adaptation processing. In this case, for example, the image acquisition function 52 may acquire the estimation result for each input image by causing the object estimation function 42 to use the estimation model 40 to estimate the positions or the number of objects. Thus, the image acquisition function 52 can perform adaptation processing, using the input image for which the error of the estimation result needs to be reduced out of the input images.

The image acquisition function 52 may skip the process at step S144. Specifically, the image acquisition function 52 may perform the adaptation processing using all the input images acquired at step S142.

Figures 8, 9:
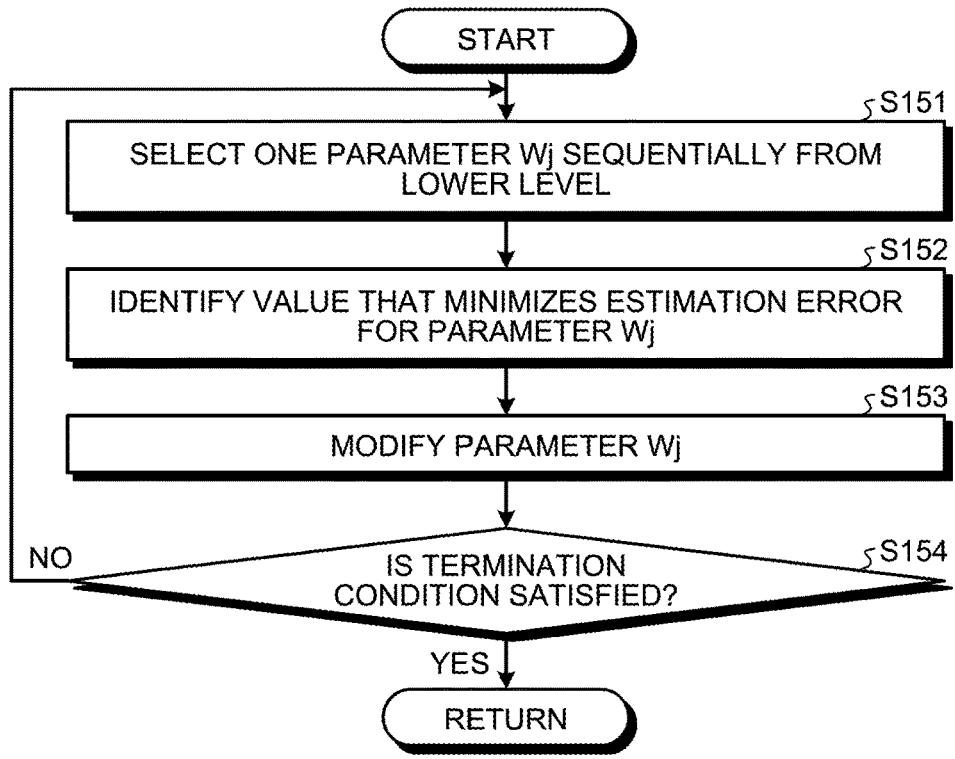
FIG. 8 is a diagram illustrating one example of a screen for inputting a termination condition.
FIG. 9 is a flowchart illustrating a processing procedure of adaptation processing.

Subsequently, at step S145, the termination-condition acquisition function 58 acquires a termination condition for the adaptation processing. For example, the termination-condition acquisition function 58 may display an interface image as depicted in FIG. 8, and may acquire a value of an estimation error or an elapsed time input by the user as the termination condition. Alternatively, the termination-condition acquisition function 58 may acquire a termination condition stored in advance from the memory circuit 34.

Subsequently, at step S146, the adaptation function 56 performs adaptation processing for adapting the estimation model 40 to a specific location. More specifically, the adaptation function 56 sequentially selects parameters of the estimation model 40 from the lower level toward the higher level one by one. The adaptation function 56 then modifies the selected parameters in such a manner to reduce estimation errors in the positions or the number of objects contained in each of the input images.

At step S146, if the termination condition is satisfied, the termination control function 60 terminates the adaptation processing performed by the adaptation function 56. For example, in the case that the termination condition is a value of an estimation error, the termination control function 60 terminates the adaptation processing when the estimation error has decreased to the acquired value or below. For another example, in the case the termination condition is an elapsed time from the start of the adaptation processing, the termination control function 60 terminates the adaptation processing when the time has elapsed more than the acquired elapsed time from the start of the adaptation processing.

Subsequently, at step S147, the image acquisition function 52 determines whether the processing has been completed on all of the captured images. If the processing has not been completed on all of the captured images (No at step S147), the image acquisition function 52 returns to the process at step S141, and repeats the processes from step S141. If the processing has been completed on all of the captured images (Yes at step S147), this process flow ends.

FIG. 9 is a flowchart illustrating a processing procedure of the adaptation processing at step S146. At step S146 in FIG. 5, the adaptation function 56 and the termination control function 60 perform processes depicted in FIG. 9.

To begin with, at step S151, the adaptation function 56 selects one parameter $W_j$ from the estimation model 40. In this case, the adaptation function 56 selects the parameter $W_j$ in the lowest level out of not-yet-selected parameters. When a plurality of not-yet-selected parameters exist in the same level, the adaptation function 56 may randomly select one parameter from the parameters in the same level, or may select one parameter in the order of indices, for example.

Subsequently, at step S152, the adaptation function 56 searches for and identifies, with respect to the selected parameter $W_j$, a value that minimizes the estimation error.

For example, it is assumed that the image acquisition function 52 has selected n (n is a natural number) input images $\{R_1, R_2, \ldots, R_n\}$. It is also assumed that the correct-information acquisition function 54 has acquired n pieces of correct information $\{T_1, T_2, \ldots, T_n\}$ that correspond to the n input images $\{R_1, R_2, \ldots, R_n\}$, respectively.

It is also assumed that a group of parameters included in the current estimation model 40 is $\{W_1, W_2, \ldots, W_m\}$. It is also assumed that the estimation result of objects contained in an input image $R_i$ that has been estimated by using the current estimation model 40 is $E_i(W_1, W_2, \ldots, W_m)$. The letter "i" is a natural number between 1 and n inclusive.

In this case, the estimation error $D(W_1, W_2, \ldots, W_m)$ is expressed by the following equation (1).

$$D(W_1, W_2, \ldots, W_m) = \Sigma(|E_i(W_1, W_2, \ldots, W_m) - T_i|) \quad (1)$$

In the equation (1), $|E_i(W_1, W_2, \ldots, W_m) - T_i|$ represents a distance when the positions of objects (e.g., persons) are estimated, and represents the absolute value of difference when the number of objects (e.g., persons) is estimated. In the equation (1), $\Sigma(x_i)$ represents the sum of $x_i$ when i is changed from 1 to n one by one.

When having selected the j-th parameter $W_j$ (j is any one of natural numbers from 1 to m), the adaptation function 56 retrieves, out of values that the parameter $W_j$ can take, a value of the parameter $W_j$ that minimizes $D(W_1, \ldots, W_j, \ldots, W_m)$ expressed by the equation (1). Consequently, the adaptation function 56 can identify a value that minimizes the estimation error for the selected parameter $W_j$.

Subsequently, at step S153, the adaptation function 56 modifies the selected parameter $W_j$ to the identified value in the estimation model 40.

Subsequently, at step S154, the termination control function 60 determines whether the termination condition is satisfied. If the termination condition is not satisfied (No at step S154), the termination control function 60 returns to the process at step S151, and causes the adaptation function 56 to select the subsequent parameter to modify this selected parameter. If the termination condition is satisfied (Yes at step S154), the termination control function 60 ends this process flow, and returns to the process flow in FIG. 5.

Effect

As described above, the model adaptation function 50 according to the present embodiment sequentially selects parameters of the estimation model 40 from the lower level to modify the estimation model when adapting the estimation model 40 to the specific location where the image-capturing device 12 is installed. This allows the model adaptation function 50 to adjust the parameters in the order from a parameter that exerts less influence on the adjustment result of other parameters.

For example, it is assumed that the first parameter and the second parameter that are allocated to nodes in the lowest level in the estimation model 40 are to be adjusted. To begin with, the first parameter is adjusted so as to minimize the estimation error. Subsequently, the second parameter is adjusted so as to minimize the estimation error. In this case, even after the second parameter is adjusted, the value of the first parameter that minimizes the estimation error does not change. Thus, adjusting the parameters in this procedure eliminates the need of adjusting the first parameter again. Consequently, the model adaptation function 50 can reduce estimation errors efficiently with less frequent adjustment.

Furthermore, when adapting the estimation model 40 to the specific location, the model adaptation function 50 according to the present embodiment terminates the adaptation processing if the acquired termination condition is satisfied. This allows the model adaptation function 50 to reduce the estimation errors efficiently at limited cost.

Estimation

The following describes processing of estimating the number of objects using the estimation model 40 that is a random forest.

Figure 10:
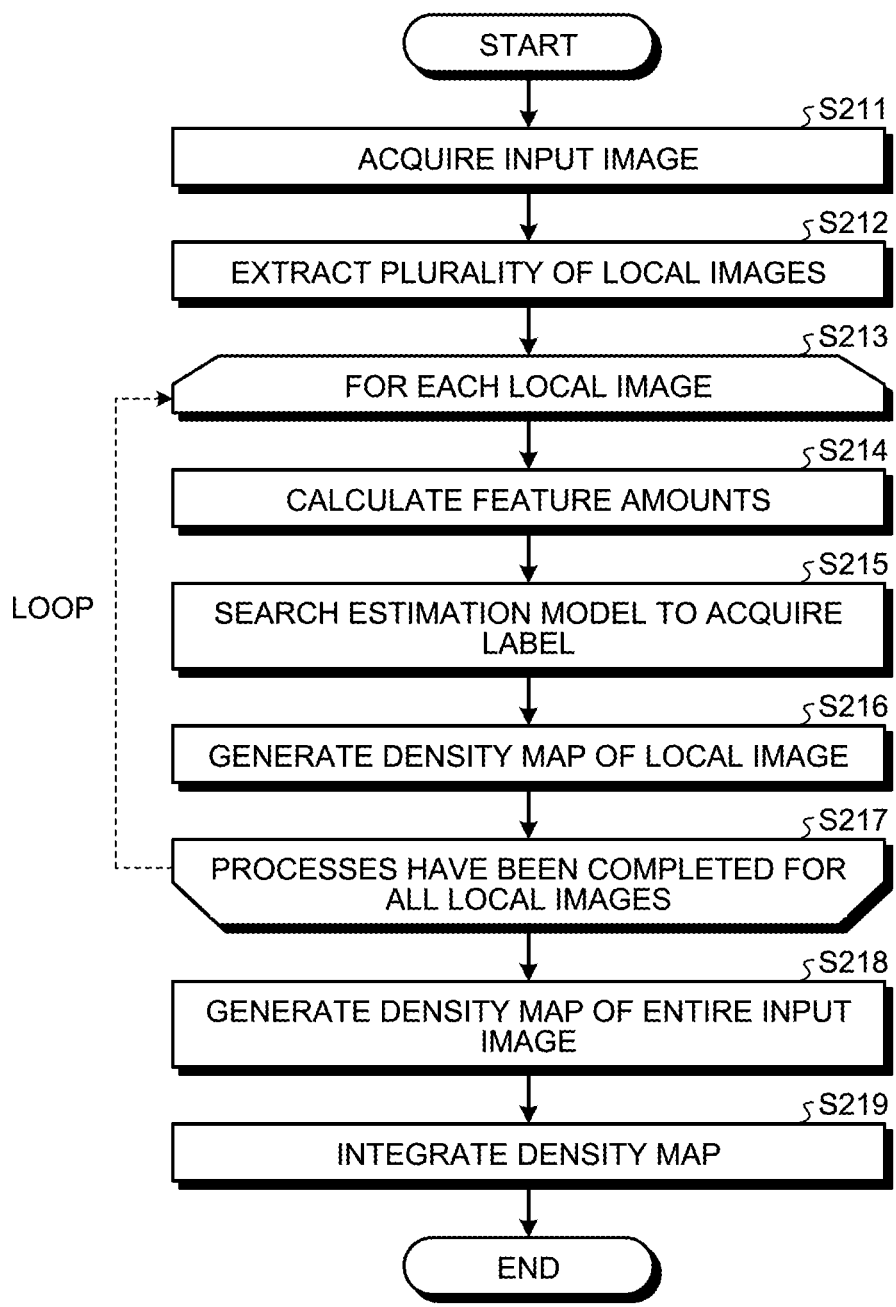
FIG. 10 is a flowchart illustrating one example of a procedure of estimation.

FIG. 10 is a flowchart illustrating one example of a procedure of this estimation. When the estimation model 40 based on the random forest is used to estimate the number of persons on the basis of an input image captured by the image-capturing device 12, for example, the object estimation function 42 performs processing in accordance with the processes depicted in FIG. 10.

Figure 11:
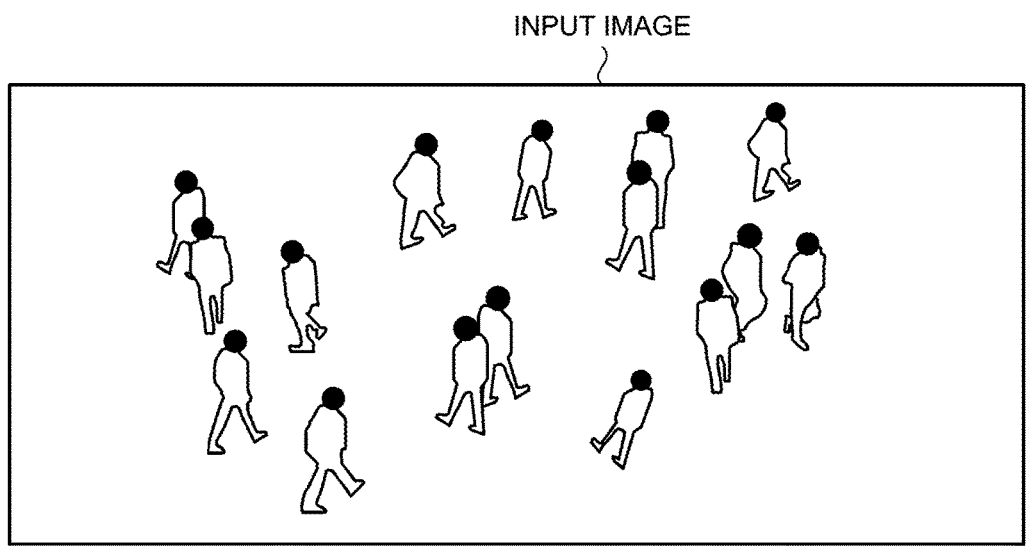
FIG. 11 is a diagram illustrating one example of an input image.

To begin with, at step S211, the object estimation function 42 acquires an input image. For example, the object estimation function 42 acquires an input image containing a plurality of objects (persons) as depicted in FIG. 11.

Figure 12:
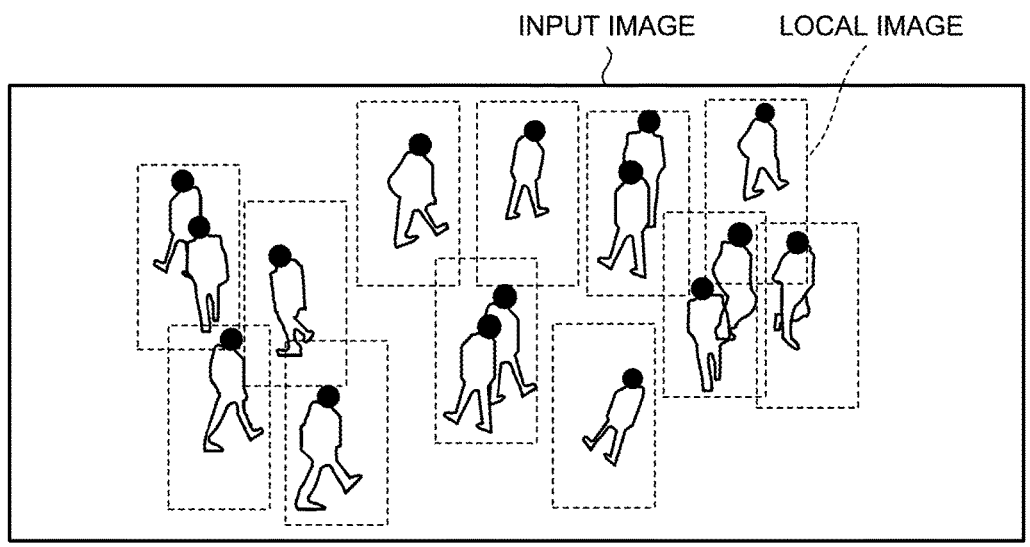
FIG. 12 is a diagram illustrating one example of a plurality of local images extracted from the input image.
Figure 13:
FIG. 13 is a diagram illustrating one example of a local image.

Subsequently, at step S212, the object estimation function 42 extracts a plurality of local images containing the objects from the input image. All of the local images have the same shape and size. For example, the object estimation function 42 extracts a plurality of local images indicated by dotted lines from the input image as depicted in FIG. 12. Some of the local images may partially overlap other local images. FIG. 13 illustrates one example of one local image thus extracted. In the examples in FIG. 12 and FIG. 13, the local images each has a rectangular shape. However, the local images may have any shape.

Subsequently, the object estimation function 42 performs the processes from step S214 to step S216 for each extracted local image (loop processing between step S213 and step S217). At step S214, the object estimation function 42 calculates a plurality of feature amounts for a target local image.

A parameter for classifying a local image by the feature amount of an image is allocated to each node of the estimation model 40 based on the random forest. The feature amounts classified by the estimation model 40 are, for example, feature amounts in which pixel values of pixels constituting an image are one-dimensionally aligned, feature amounts in which these aligned feature amounts are normalized by the difference (i.e., the slope) between adjacent pixel values, and scale-invariant feature transform (SIFT) feature amount. The estimation model 40 may include parameters for classifying local images by feature amounts other than those described above. The object estimation function 42 calculates feature amounts that the estimation model 40 uses for classification for the target local image.

Subsequently, at step S215, the object estimation function 42 searches the estimation model 40 using the calculated feature amounts to acquire a label corresponding to the target local image.

Figure 14:
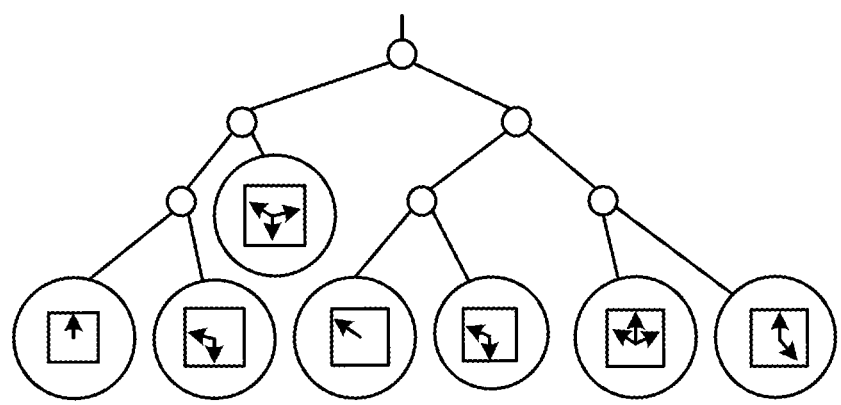
FIG. 14 is a diagram illustrating the estimation model in which labels are allocated to terminal nodes.

In the estimation model 40, as depicted in FIG. 14, labels are allocated to terminal nodes. Each label corresponds to vector information that represents the positions of objects (persons) in a local image.

Figure 15:
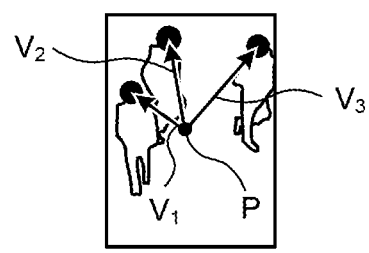
FIG. 15 is a diagram illustrating vector information that represents positions of persons in the local image.

As depicted in FIG. 15, the vector information represents the directions and the distances of specific parts of objects (e.g., heads of persons) with respect to a predetermined position P in the local image. For example, in the example in FIG. 15, the vector information includes $V_1$, $V_2$, and $V_3$ representing the positions and the distances of three persons. The vector information may represent the position of one object, may represent the positions of two objects, or may represent the positions of four or more objects.

In the estimation model 40, by machine learning, labels for identifying the vector information are allocated in advance to terminal nodes. Furthermore, in the estimation model 40, by machine learning, parameters for classifying feature amounts are allocated in advance to the respective nodes.

Figure 16:
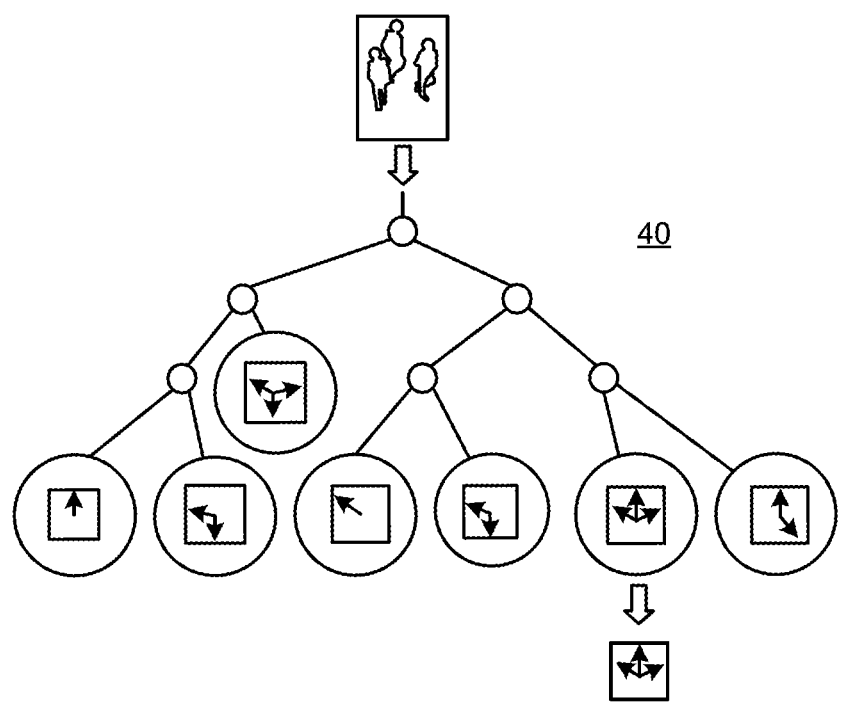
FIG. 16 is a diagram illustrating one example of the labels classified by the estimation model.

Thus, as depicted in FIG. 16, the object estimation function 42 gives a plurality of types of feature amounts calculated on the basis of the local image to the estimation model 40, thereby being able to acquire a label (vector information) allocated to any one of the terminal nodes.

Figure 17:
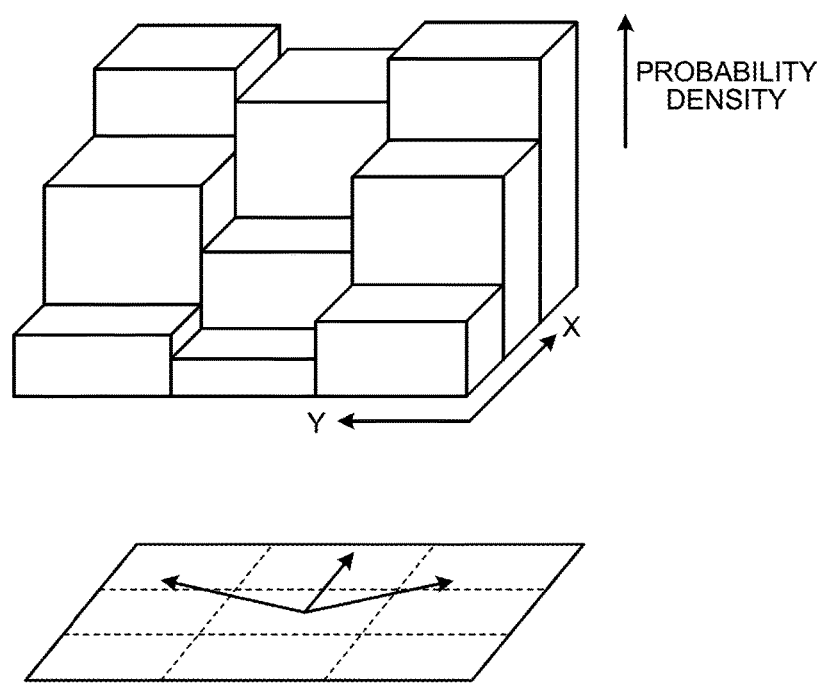
FIG. 17 is a diagram illustrating one example of a density map of the local image.

Subsequently, at step S216, the object estimation function 42 generates a density map of the local image corresponding to the acquired label. The density map of the local image represents probability densities of objects at the respective positions thereof in the local image as depicted in FIG. 17. The object estimation function 42 may acquire a density map that corresponds to the label and is stored in advance, or may calculate the probability densities on the basis of the vector information corresponding to the label. The density map of the local image may represent probability densities of objects in a three-dimensional space.

After completing the processes at step S214 through step S216 on all of the local images, the object estimation function 42 exits from the loop between step S213 and step S217 to proceed to the process at step S218.

Figure 18:
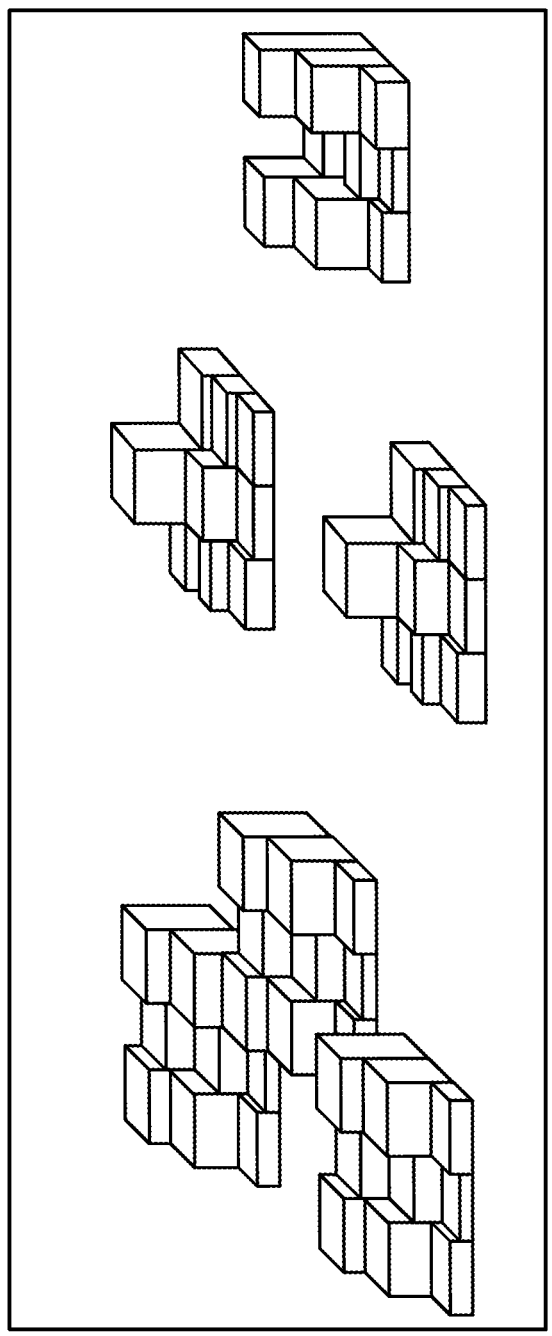
FIG. 18 is a diagram illustrating one example of a density map of the entire input image.

At step S218, the object estimation function 42 arranges density maps of the respective local images at the corresponding positions thereof in the input image to generate a density map of the entire input image. For example, the object estimation function 42 generates a density map as depicted in FIG. 18. The density map of the entire input image represents probability densities of objects at the corresponding positions thereof in the entire input image. The density map of the entire input image may represent probability densities of objects in a three-dimensional space.

Subsequently, at step S219, the object estimation function 42 integrates the density map of the entire input image. The object estimation function 42 then outputs the integrated value as the number of objects contained in the input image.

By performing the above-described processing, the object estimation function 42 can estimate the number of objects in the input image, using the estimation model 40 that is a random forest.

The computer in the embodiment is configured to perform the above-described respective processing operations in the embodiment on the basis of the programs stored in the storage medium, and may be configured in any form such as a device structured with one of a personal computer and a microcomputer, for example, or a system to which a plurality of devices are connected via a network. The computer in the embodiment is not limited to a personal computer, and is a general term for equipment or a device that can implement the functions in the embodiment by the programs, including an arithmetic processing unit and a microcomputer included in information processing equipment.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory; and
processing circuitry configured to:
   acquire an input image captured by an image-capturing device installed in a specific location;
   perform adaptation processing of adapting an estimation model, which is used for detecting positions or the number of objects contained in an image, to the specific location by sequentially selecting a parameter of the estimation model from a lower level toward a higher level, and by modifying the selected parameter in such a manner to reduce an estimation error in the positions or the number of the objects contained in the input image;
   acquire a termination condition for the adaptation processing; and
   terminate the adaptation processing when the termination condition is satisfied.

2. The apparatus according to claim 1, wherein
the termination condition is a value of the estimation error, and
the processing circuitry terminates the adaptation processing when the estimation error decreases to an acquired value or below.

3. The apparatus according to claim 1, wherein
the termination condition is an elapsed time from start of the adaptation processing, and
the processing circuitry terminates the adaptation processing when time is elapsed more than an acquired elapsed time from the start of the adaptation processing.

4. The apparatus according to claim 1, wherein
the processing circuitry acquires a plurality of input images, and
the processing circuitry modifies the selected parameter in such a manner to reduce the estimation error in the positions or the number of the objects in each of the input images.

5. The apparatus according to claim 4, wherein
when performing the adaptation processing, the processing circuitry:
   sequentially selects a parameter of the estimation model from a lower level toward a higher level one by one;
   estimates, using the estimation model, the positions or the number of the objects contained in each input image;
   calculates the estimation error for each input image, based on an estimation result of the positions or the number of the objects contained in the input image and on correct information on the positions or the number of the objects contained in the input image;
   instructs the estimation unit to change a value of the selected parameter;
   receives the estimation error for each input image from the error calculation unit;
   identifies, for the selected parameter, a value that minimizes a sum of the estimation errors for the acquired input images; and
   modifies the value of the selected parameter in the estimation model to the identified value, and
   when sequentially selecting the parameter, the processing circuitry receives a termination instruction from the termination controller, and terminates processing of selecting the parameter when the termination instruction is received.

6. The apparatus according to claim 5, wherein the estimation model is a random forest having a plurality of nodes connected in a tree structure, in which a parameter for classifying an image is allocated to each node, and a label is allocated to a terminal node.

7. The apparatus according to claim 6, wherein
the objects are persons,
in the estimation model, a parameter for classifying an image based on a feature amount of the image is allocated to each node, and
the processing circuitry extracts one or more local images from the input image, classifies the local images based on the estimation model, acquires the labels respectively corresponding to the local images, and estimates the number of persons contained in the input image based on the acquired labels.

8. The apparatus according to claim 1, wherein
the processing circuitry
divides a captured image captured by the image-capturing device into input images each having a predetermined size, and
selects, out of the input images divided, the input image for which an error between the estimation result of the positions or the number of the objects estimated by using the estimation model and the correct information on the positions or the number of the objects contained in the input image is equal to or greater than a predetermined value, and
the processing circuitry performs the adaptation processing, using the selected input image.

9. The apparatus according to claim 8, wherein
the processing circuitry further configured to acquire the correct information that is input by a user.

10. The apparatus according to claim 1, wherein the processing circuitry acquires the termination condition that is input by a user.

11. An information processing method comprising:
acquiring, by processing circuitry, an input image captured by an image-capturing device installed in a specific location;
performing, by the processing circuitry, adaptation processing of adapting an estimation model, which is used for detecting positions or the number of objects contained in an image, to the specific location by sequentially selecting a parameter of the estimation model from a lower level toward a higher level, and by modifying the selected parameter in such a manner to reduce an estimation error in the positions or the number of the objects contained in the input image;
acquiring, by the processing circuitry, a termination condition of the adaptation processing; and
terminating, by the processing circuitry, the adaptation processing when the termination condition is satisfied.

12. The method according to claim 11, wherein
the termination condition is a value of the estimation error, and
the adaptation processing is terminated when the estimation error decreases to an acquired value or below.

13. The method according to claim 11, wherein
the termination condition is an elapsed time from start of the adaptation processing, and
the adaptation processing is terminated when time is elapsed more than an acquired elapsed time from the start of the adaptation processing.

14. The method according to claim 11, further comprising:
acquiring, by the processing circuitry, a plurality of input images, and
modifying, by the processing circuitry, the selected parameter in such a manner to reduce the estimation error in the positions or the number of the objects in each of the input images.

15. The method according to claim 14, further comprising:
when performing the adaptation processing,
sequentially selecting, by the processing circuitry, a parameter of the estimation model from a lower level toward a higher level one by one;
estimating, by the processing circuitry, using the estimation model, the positions or the number of the objects contained in each input image;
calculating, by the processing circuitry, the estimation error for each input image, based on an estimation result of the positions or the number of the objects contained in the input image and on correct information on the positions or the number of the objects contained in the input image;
instructing, by the processing circuitry, changing a value of the selected parameter;
receiving, by the processing circuitry, the estimation error for each input image;
identifying, by the processing circuitry, for the selected parameter, a value that minimizes a sum of the estimation errors for the acquired input images; and
modifying, by the processing circuitry, the value of the selected parameter in the estimation model to the identified value, and
when sequentially selecting the parameter,
receiving a termination instruction, and
terminating processing of selecting the parameter when the termination instruction is received.

16. The method according to claim 15, wherein the estimation model is a random forest having a plurality of nodes connected in a tree structure, in which a parameter for classifying an image is allocated to each node, and a label is allocated to a terminal node.

17. The method according to claim 16, wherein
the objects are persons,
in the estimation model, a parameter for classifying an image based on a feature amount of the image is allocated to each node, and
the method further comprises:
extracting, by the processing circuitry, one or more local images from the input image;
classifying, by the processing circuitry, the local images based on the estimation model;
acquiring, by the processing circuitry, the labels respectively corresponding to the local images; and
estimating, by the processing circuitry, the number of persons contained in the input image based on the acquired labels.

18. The method according to claim 11, further comprising:
when acquiring the input image,
dividing, by the processing circuitry, a captured image captured by the image-capturing device into input images each having a predetermined size;
selecting, by the processing circuitry, out of the input images divided, the input image for which an error between the estimation result of the positions or the number of the objects estimated by using the estimation model and the correct information on the positions or the number of the objects contained in the input image is equal to or greater than a predetermined value; and performing, by the processing circuitry, the adaptation processing, using the selected input image.

19. The method according to claim 18, further comprising:
acquiring, by the processing circuitry, the correct information that is input by a user.

20. A computer program product comprising a non-transitory computer-readable medium containing a program executed by a computer, the program causing the computer to execute:
acquiring an input image captured by an image-capturing device installed in a specific location;
performing adaptation processing of adapting an estimation model, which is used for detecting positions or the number of objects contained in an image, to the specific location by sequentially selecting a parameter of the estimation model from a lower level toward a higher level, and by modifying the selected parameter in such a manner to reduce an estimation error in the positions or the number of the objects contained in the input image;
acquiring a termination condition of the adaptation processing; and
terminating the adaptation processing when the termination condition is satisfied.

* * * * *